United States Patent
Kawarai et al.

(10) Patent No.: US 8,058,582 B2
(45) Date of Patent: *Nov. 15, 2011

(54) ELECTRICAL DISCHARGE MACHINING APPARATUS AND ELECTRICAL DISCHARGE MACHINING METHOD

(75) Inventors: Hisakatsu Kawarai, Tokyo (JP); Syuichiro Ishihara, Tokyo (JP); Yoji Nakajima, Tokyo (JP); Hisashi Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1033 days.

This patent is subject to a terminal disclaimer.

(21) Appl. No.: 11/910,581

(22) PCT Filed: Oct. 18, 2006

(86) PCT No.: PCT/JP2006/320720
§ 371 (c)(1),
(2), (4) Date: Oct. 3, 2007

(87) PCT Pub. No.: WO2008/047420
PCT Pub. Date: Apr. 24, 2008

(65) Prior Publication Data
US 2009/0277876 A1    Nov. 12, 2009

(51) Int. Cl.
*B23H 1/10* (2006.01)
(52) U.S. Cl. .............................. 219/69.14; 219/69.17
(58) Field of Classification Search ............... 219/69.14, 219/69.17, 69.11, 69.12, 69.13
See application file for complete search history.

(56) References Cited

U.S. PATENT DOCUMENTS

| 4,130,493 | A | * | 12/1978 | Inoue | 219/69.14 |
| 4,387,014 | A | * | 6/1983 | Stengel | 219/69.15 |
| 5,081,333 | A | * | 1/1992 | Yatomi et al. | 219/69.14 |
| 5,985,152 | A | * | 11/1999 | Otaka et al. | 210/668 |
| 7,737,380 | B2 | * | 6/2010 | Kawarai et al. | 219/69.14 |
| 7,795,558 | B2 | * | 9/2010 | Nakajima et al. | 219/69.14 |

FOREIGN PATENT DOCUMENTS

| DE | 28 51 482 C2 | 5/1979 |
| DE | 4391902 C2 | 6/1994 |
| DE | 11-2005-002782 T5 | 3/2008 |
| DE | 11-2006-000044 T5 | 7/2008 |
| JP | 61-192416 A * | 8/1986 |
| JP | 61-197128 A * | 9/1986 |
| JP | 63-191514 A | 8/1988 |
| JP | 05-042414 A | 2/1993 |
| JP | 2694145 B2 * | 12/1997 |
| JP | 11-070414 A | 3/1999 |
| JP | 2002-2301624 A | 10/2002 |
| JP | 2004-291206 A | 10/2004 |
| JP | 2004-4291206 A | 10/2004 |

* cited by examiner

*Primary Examiner* — Geoffrey S Evans
(74) *Attorney, Agent, or Firm* — Sughrue Mion, PLLC

(57) ABSTRACT

An electrical-discharge machining apparatus for machining a workpiece using an aqueous machining fluid includes an insulator for electrically insulating a machine platen from the workpiece where the workpiece is placed. A machining-fluid-property measuring instrument measures the state of the machining fluid; and a machining-fluid-property controller maintains the pH of the machining fluid so as to be kept within 8.5 through 10.5.

20 Claims, 4 Drawing Sheets

| Set Value of Conductivity Meter | Water-purification-resin Electromagnetic Valve | Corrosion-prevention-resin Electromagnetic Valve |
|---|---|---|
| Higher than Preset Valve | Open (Fluid pass-through) | Close |
| Lower than Preset Valve | Close | Open (Fluid pass-through) |

ELECTRICAL DISCHARGE MACHINING APPARATUS AND ELECTRICAL DISCHARGE MACHINING METHOD

CROSS REFERENCE TO RELATED APPLICATIONS

This application is a National Stage of International Application No. PCT/JP2006/320720 filed on Oct. 18, 2006, the contents of all of which are incorporated herein by reference in their entirety.

TECHNICAL FIELD

The present invention relates to electrical discharge machining apparatus that have a prevention capability against corrosion associated with immersion of a workpiece in the machining fluid for a long time.

BACKGROUND ART

In an electrical discharge machining apparatus that machines a workpiece, while spraying the machining fluid thereonto or immersing the workpiece in the machining fluid, and applying pulse voltages between the workpiece and an electrode so as to generate electrical discharge, when water is utilized as the machining fluid, electrical insulation properties are required therefor, so that ion exchanged water is usually used. And then, as for this ion exchanged water (machining fluid), tap water is passed through an ion exchange resin that is formed of a mixture of, for example, a cation exchange resin of $H^+$ (hydrogen ion) type and an anion exchange resin of $OH^-$ (hydroxide ion) type, so that machining fluid required for electrical discharge machining is produced from which contaminants have been removed.
Note that, in the ion exchange resin, cations such as sodium ions ($Na^+$) and/or calcium ions ($Ca^{2+}$) contained in the tap water are exchanged for $H^+$ by coming in contact with the cation exchange resin of $H^+$ type, and anions such as chloride ions ($Cl^-$) and/or sulfate ions ($SO_4^{2-}$) are exchanged for $OH^-$ by coming in contact with the anion exchange resin of $OH^-$ type; as a result, contaminants contained in the tap water are removed, and $H^+$ and $OH^-$ are coupled, so that water $H_2O$ is produced.

In an electrical discharge machining apparatus using such an aqueous machining fluid, it is known that, when a workpiece is immersed in the aqueous machining fluid for a long time, the workpiece is corroded, resulting in lowering product quality of the workpiece.
For this reason, a method of preventing corrosion of a workpiece is proposed in which anti-corrosion electrodes are mounted to the workpiece and to a location adjacent to the workpiece, voltage is applied across the workpiece and the anti-corrosion electrodes, and then a mean voltage at the workpiece side is controlled so as to be zero or negative. (For example, refer to Patent Document 1.)
In addition, a method of preventing corrosion of a workpiece is also proposed in which, by intervening an insulating material between a machine platen and the workpiece, voltage is applied across the machine platen as an anode and the workpiece as a cathode. (For example, refer to Patent Document 2.)

[Patent Document 1] Japanese Patent Application Publication No. H11-70414, and
[Patent Document 2] Japanese Patent Application Publication No. 2004-291206.

DISCLOSURE OF THE INVENTION

Problems to be Solved by the Invention

The conductivity of a machining fluid when contaminants are removed by an ion exchange resin generally becomes 70 (µS/cm) or less. In addition, although a "pH" level is determined by hydrogen-ion concentration, because "$OH^-$" ions having been exchanged for hydrogen carbonate ions ($HCO_3^-$) or the like are released into in the machining fluid, there is not an extreme change in the hydrogen-ion concentration, so that the pH is usually 7.
And then, in such a machining fluid, although there are very few corrosive ions such as $Cl^-$ that have strong action to destroy a passivation film, the workpiece is to be corroded by dissolved oxygen in the machining fluid. For example, in a case in which the workpiece is a superhard alloy (WC—Co), cobalt (Co) that is a binder phase is dissolved into the machining fluid; even in a case of iron (Fe), the iron is dissolved thereinto; thereby, a corrosion product is formed on the surface of the workpiece.
When corrosion of the workpiece is prevented by such a method in Patent Document 1, the area of corrosion-prevention effects is limited, and corrosion of the workpiece is only prevented adjacent to the anti-corrosion electrodes, which has caused a problem.
In addition, when corrosion of the workpiece is prevented by such a method in Patent Document 2, because the machine platen is set as an anode, the machine platen is to be corroded, which has also caused a problem.
Moreover, by the methods in both patent documents, without providing an anti-corrosion power source, corrosion of the workpiece can not be prevented, which has caused a problem.
The present invention has been directed at solving those problems described above, and an object of the invention is to provide an electrical discharge machining apparatus in which a corrosion-prevention capability is exerted all over a machining tank, and, without using an external power source, it is possible to prevent corrosion of a workpiece over a prolonged time.

Means for Solving the Problems

In one aspect of the present invention, an electrical discharge machining apparatus machines a workpiece, using an aqueous machining fluid as a machining fluid, while applying voltage across a machining gap formed between an electrode and the workpiece; the electrical-discharge machining apparatus comprises: an insulating means for electrically insulating from the workpiece a machine platen where the workpiece is placed; a machining-fluid-property measuring instrument for measuring a state of the machining fluid; and a machining-fluid-property control means for controlling, based on the measured result from the machining-fluid-property measuring instrument, the pH of the machining fluid so as to be kept within 8.5 through 10.5.

Effects of the Invention

According to the present invention, effects can be obtained in which, using a machining fluid having electrical insulation properties required for electrical discharge machining (conductivity 70 µS/cm or less) and a pH ranging from 8.5 to 10.5, and by electrically insulating a machine platen from a workpiece, a corrosion-prevention capability is exerted all over a machining tank, so that without using an external power source, corrosion of the workpiece is prevented over a prolonged time.

BEST MODE FOR CARRYING OUT THE INVENTION

Embodiment 1

Figure 1:
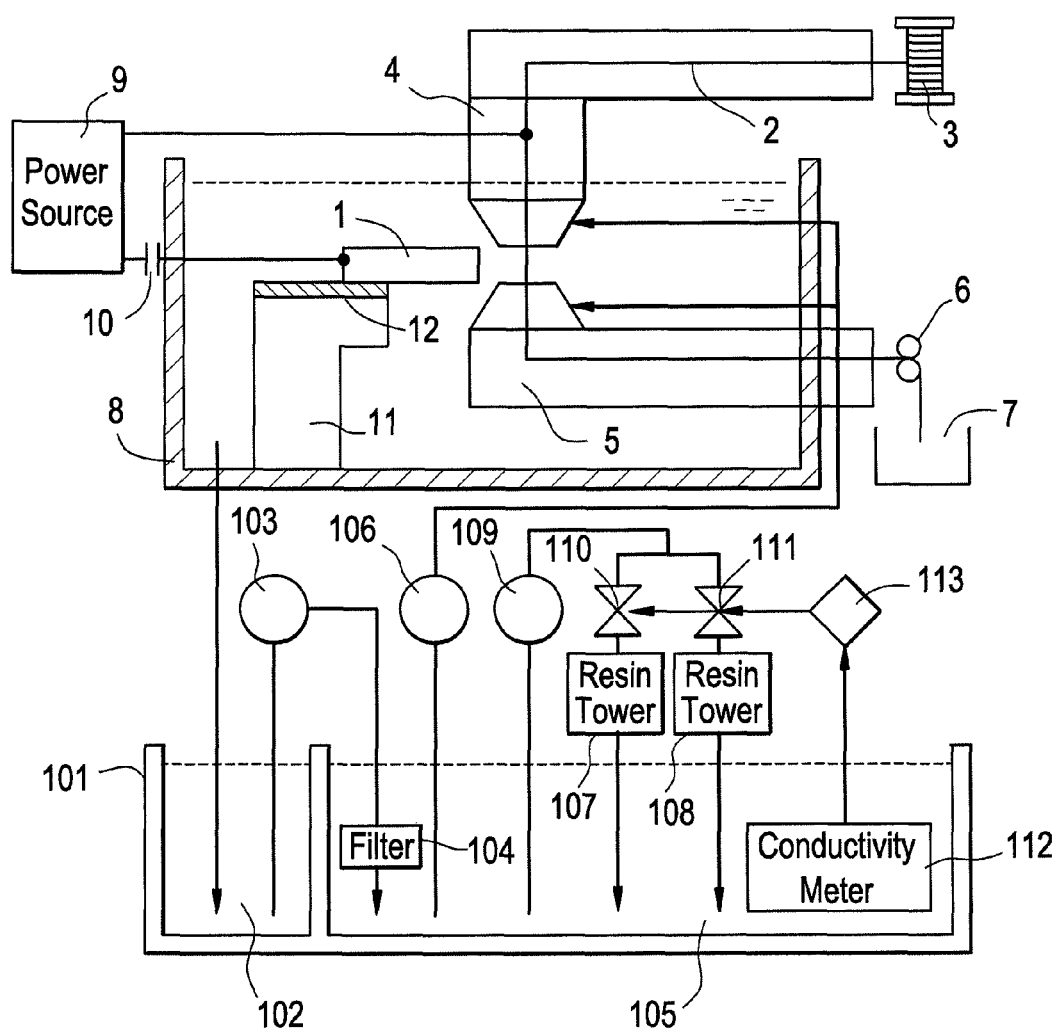
FIG. 1 is a diagram outlining a configuration of a wire-cut electrical-discharge machining apparatus in Embodiment 1.

FIG. 1 is a configuration diagram outlining an overall structure in this embodiment.

To be specific, a wire-cut electrical-discharge machining apparatus is shown in which a workpiece is placed while an insulating material is in the state of intervening between a machine platen and the workpiece; by using a corrosion-prevention resin and a conductivity meter as a fluid-property measuring instrument, the pH of the machining fluid is controlled at 9.0. The wire-cut electrical-discharge machining apparatus proceeds machining by applying voltage between a workpiece 1 and a wire electrode 2, and by providing electrical discharge via the machining fluid that is spouted from an upper machining-fluid nozzle 4 and a lower machining-fluid nozzle 5, so that part of the workpiece 1 is melted and removed.

At this time, because the wire electrode 2 is also melted at discharging portions and degraded thereat according to electrical-discharge machining progress, the wire electrode 2 wound around a wire spool 3 is continuously fed into a recovering container 7 by way of the upper machining-fluid nozzle 4, the lower machining-fluid nozzle 5 and recovering rollers 6 so that the wire electrode 2 is freshly fed to a machining part according to the progress of machining.

Here, the workpiece 1 is set in a state electrically insulated, via an insulating material 12, from a machine platen 11 that uses stainless steel, and is placed thereon.

Moreover, energy used for the electrical discharge machining is supplied from a machining power source 9 between the workpiece 1 and the wire electrode 2 that are located in a machining tank 8 filled with the machining fluid; by controlling between the conducting and non-conducting states of a contactor 10, whether or not electrical discharge is generated is controlled.

As for the machining fluid in the machining tank 8, sludge therein is removed and the pH of the machining fluid is controlled by a machining-fluid-property control device main body 101 so that the machining fluid therein is flowed back into the machining tank 8. To be specific, the machining fluid that is spouted out from the upper machining-fluid nozzle 4 and the lower machining-fluid nozzle 5, containing much of contaminants after the sludge produced at a machining part is washed out, is temporally stored in the machining tank 8, and is afterward guided into a contaminated fluid tank 102 via a piping route.

The machining fluid stored in the contaminated fluid tank 102 is pumped up by a filtration pump 103 and filtered through a filtration filter 104 so that the fluid's contaminants such as the sludge are removed, and then stored into a cleansed fluid tank 105.

As for the machining fluid in the cleansed fluid tank 105, the conductivity thereof is measured by a conductivity meter 112 that is a machining-fluid-property measuring instrument, and a measured result thereof is sent into a control unit 113. The control unit 113 compares the measured result from the conductivity meter 112 with a preset value that has been predetermined, and performs the open/close operation of a water-purification-resin electromagnetic valve 110 or a corrosion-prevention-resin electromagnetic valve 111.

Based on the open/close operation of the water-purification-resin electromagnetic valve 110 or the corrosion-prevention-resin electromagnetic valve 111, the machining fluid pumped up by a resin pump 109 is supplied into a water-purification resin tower 107 in which a water-purification resin is contained, and/or a corrosion-prevention resin tower 108 that contains the corrosion-prevention resin, and is flowed back into the cleansed fluid tank 105 so that the fluid's predetermined pH is maintained.

In addition, by using a machining-fluid pump 106, the fluid is spouted out between the workpiece 1 and the wire electrode 2 via the upper machining-fluid nozzle 4 and the lower machining-fluid nozzle 5.

In the next place, the corrosion-prevention resin tower 108 will be explained in detail.

The corrosion-prevention resin tower 108 utilizes a mixed resin of a cation exchange resin of $Na^+$ type and an anion exchange resin of $OH^-$ type. In such a manner, the machining fluid becomes a diluted aqueous solution of NaOH.

Figure 2:
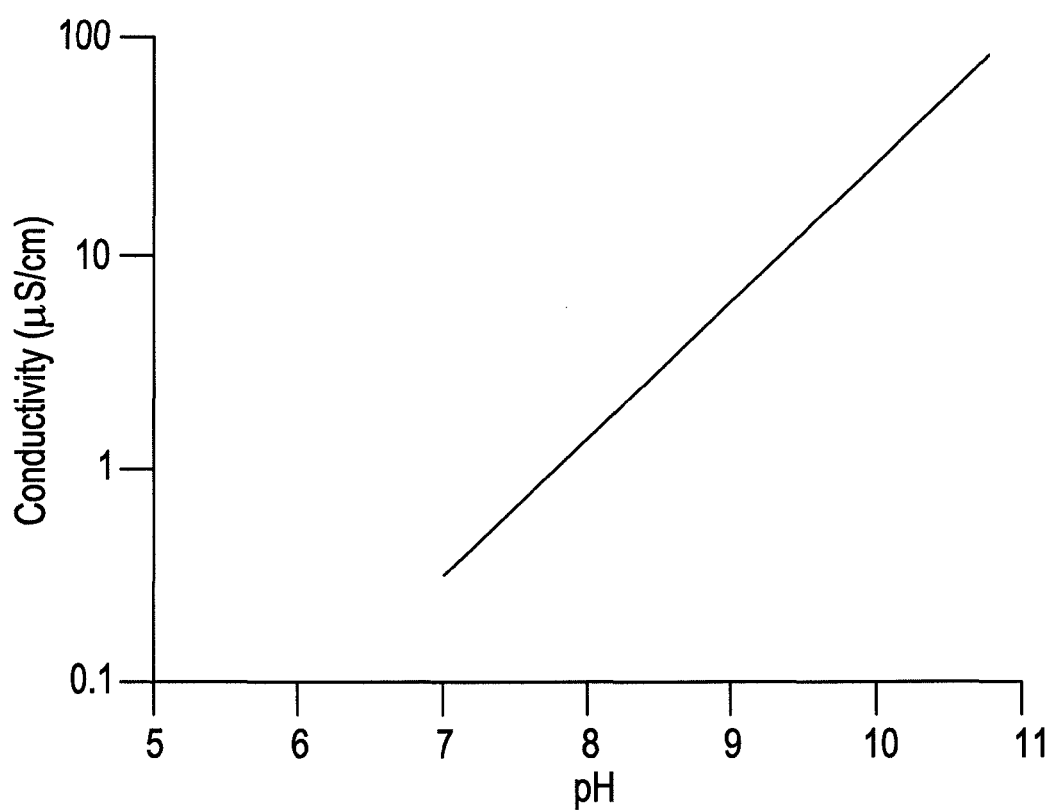
FIG. 2 is a diagram showing a relation between conductivity of aqueous solution of NaOH and "pH"

As shown in FIG. 2, because a stable relation is held between the conductivity of aqueous solution of NaOH and the pH thereof, by controlling the conductivity of aqueous solution of NaOH, the pH of machining fluid can be controlled as well.

For example, when a preset conductivity of the machining fluid is 6.2 µS/cm, the pH becomes 9.0; whereby, when the conductivity (pH level) is higher than the preset value, the water-purification-resin electromagnetic valve 110 is started operating; the machining fluid in the cleansed fluid tank 105 is sent into the water-purification resin tower 117 via a piping route; thus, metal ions produced by the electrical discharge machining, carbonate ions owing to carbon dioxide gas in the atmosphere, and the like are removed, so that the conductivity (pH level) of the machining fluid is lowered.

In addition, when the conductivity (pH level) of the machining fluid becomes lower than a preset value that has been predetermined, in order to maintain the pH level and not to impair the corrosion-prevention characteristic of the machining fluid, the corrosion-prevention-resin electromagnetic valve 111 is started operating; thus, the machining fluid in the cleansed fluid tank 105 is sent into the corrosion-prevention resin tower 118 via a piping route, so that the conductivity (pH level) of the machining fluid is maintained near the preset value that has been predetermined as described above.

Figure 3:
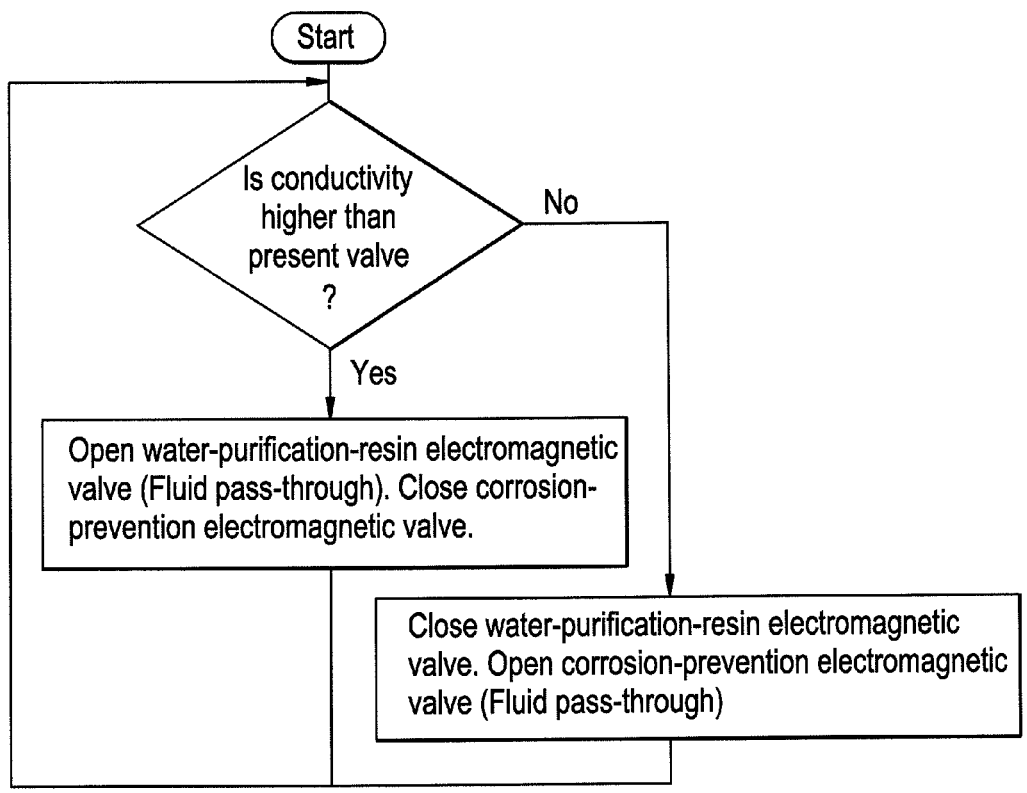
FIG. 3 includes a flowchart illustrating control operations in Embodiment 1.

In FIG. 3, the control operations described above and their flowchart are shown.

As for a control range of the pH of machining fluid in this embodiment, when the workpiece 1 is superhard alloy (such as WC—Co), Cu, Fe (iron), Zn (zinc) or the like, in order to exert a corrosion-prevention capability, it is preferable to set the lower limit of pH at 8.5.

In addition, because, when the pH is increased, so is the conductivity of the machining fluid, resulting in lowering an electrical-discharge machining capability; thus, it is preferable to set the upper limit of pH at 10.5.

As a method of controlling the pH of the machining fluid described above within 8.5 through 10.5, three methods can be considered, which are a method utilizing an ion exchange resin, a method of applying an agent, and a method utilizing an electrolyzed-water generator.

In a case of utilizing an ion exchange resin, the machining fluid (70 μS/cm or less, pH=7) having been obtained by passing tap water through a water-purification resin becomes subject to consideration.
For this reason, from a viewpoint in which the pH is also controlled by controlling the conductivity, the machining fluid becomes a diluted aqueous solution of NaOH after passing through a corrosion-prevention resin that is a mixture of a cation exchange resin of $Na^+$ type and an anion exchange resin of $OH^-$ type, so as to demonstrate a desired pH and conductivity. Here, the corrosion-prevention resin is not necessarily a mixture of a cation exchange resin and an anion exchange resin, two ion-exchange resin towers can also be used in which the towers are individually sealed with different ion-exchange resins from each other; as for the cation exchange resin, a $K^+$ type and a $Ca^{2+}$ type can be considered applicable other than the $Na^+$ type; at least one of these types can be used; as for the anion exchange resin, a $CO_3^{2-}$ type can also be applicable other than the $OH^-$ type; at least one of these types can be used.

In a case of utilizing the method of applying an agent, the agent that contains alkaline earth elements such as sodium hydroxide (NaOH) and/or calcium hydroxide ($Ca(OH)_2$) can be considered applicable; thus, the agent can be simply applied to the machining fluid (70 μS/cm or less, pH=7) after having been obtained by passing tap water through a water-purification resin.

In a case of using an electrolyzed-water generator, the machining fluid (70 μS/cm or less, pH=7) obtained by passing tap water through a water-purification resin has only to be converted, using electrolysis, into electrolyzed water of pH within 8.5 through 10.5.

Among the three methods described above, as for a machining-fluid-property measuring instrument, at least one kind of measuring instruments among, for example, a conductivity meter, a pH meter, and an oxidation-reduction potentiometer is used, and the pH is adjusted according to a command from a control unit; however, from viewpoints of controllability of the conductivity that governs a machining capability, and controllability of the pH that governs a corrosion-prevention capability of a workpiece, the method of using ion exchange resins is suitable.

In a case in which the workpiece 1 is placed on a machine platen without the insulating material 12 intervening therebetween, an electrical potential difference is generated when both materials are different from each other; in particular, when a workpiece has higher ionization tendency than that of the material for a machine platen, corrosion appears on the side of the workpiece.
By placing on the machine platen 11 the workpiece 1 with the insulating material 12 in the state of intervening therebetween, the corrosion described above can be prevented.
In order not to degrade a machining capability, ceramics of high hardness, such as alumina ($Al_2O_3$) and silica ($SiO_2$), are suitable for the insulating material 12.

In the wire-cut electrical-discharge machining apparatus in which the method of corrosion prevention for the workpiece described above is implemented, by controlling the conductivity of the machining fluid at 6.2 μS/cm (that corresponds to pH=9.0), corrosion of superhard alloy (WC—Co) was prevented even over a prolonged time (100 hours or more). In addition, by controlling the conductivity of the machining fluid at 6.2 μS/cm (that corresponds to pH=9.0), corrosion of iron material (SKD-11) was prevented even over a prolonged time (100 hours or more).

Moreover, in Embodiment 1, as a corrosion-prevention resin, a mixed resin of the cation exchange resin of $Na^+$ type and the anion exchange resin of $OH^-$ type is utilized; however, because majority of contaminant cations in the water that has been passed through the water-purification resin tower 107 are $Na^+$, only the anion exchange resin of $OH^-$ type may be used as the corrosion-prevention resin, though the degree of correlation between conductivity and pH is inferior in accuracy.

Embodiment 2

Figure 4:
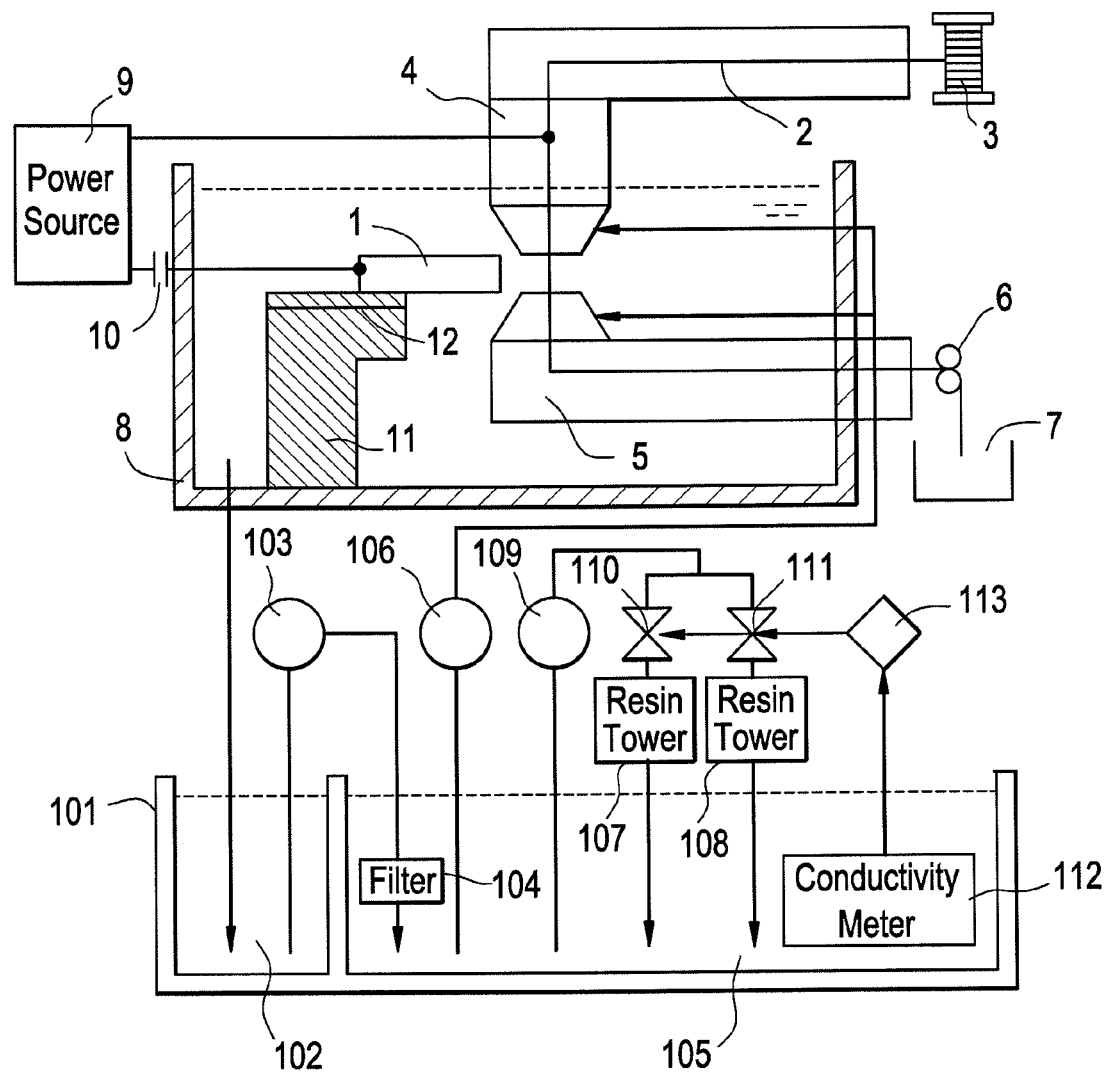
FIG. 4 is a diagram outlining a configuration of a wire-cut electrical-discharge machining apparatus in Embodiment 2.

FIG. 4 is a diagram outlining a configuration of a wire-cut electrical-discharge machining apparatus in Embodiment 2, in which the machine platen 11 is constituted of a dielectric material such as granite stone; by using a corrosion-prevention resin, and a conductivity meter as a machining-fluid-property measuring instrument, the pH of the machining fluid is controlled at 9.0.

Similarly to Embodiment 1, not only corrosion of a workpiece can be prevented over a prolonged time without using an external power source, but also necessity of the insulating material 12 intervening between the workpiece 1 and the machine platen 11 can be avoided in practice; thus, it is possible to increase efficiency in preparatory work.

In the wire-cut electrical-discharge machining apparatus in which the method of corrosion prevention for the workpiece described above is implemented, by controlling the conductivity of the machining fluid at 6.2 μS/cm (that corresponds to pH=9.0), corrosion of superhard alloy (WC—Co) was prevented even over a prolonged time (100 hours or more). In addition, by controlling the conductivity of the machining fluid at 6.2 μS/cm (that corresponds to pH=9.0), corrosion of iron material (SKD-11) was prevented even over a prolonged time (100 hours or more).

INDUSTRIAL APPLICABILITY

The present invention is suitably applied to corrosion-prevention technologies for wire-cut electrical-discharge machining apparatus that perform machining using an aqueous machining fluid while applying voltage.

The invention claimed is:
1. An electrical-discharge machining apparatus for machining a workpiece, using an aqueous machining fluid as a machining fluid, while applying voltage across a machining gap formed between an electrode and the workpiece, the electrical-discharge machining apparatus, comprising:
an insulating means for electrically insulating from the workpiece a machine platen where the workpiece is placed;
a machining-fluid-property measuring instrument for measuring a state of the machining fluid; and
a machining-fluid-property control means for controlling, based on a measured result from said machining-fluid-property measuring instrument, the pH of the machining fluid so as to be kept within 8.5 through 10.5.
2. The electrical-discharge machining apparatus as set forth in claim 1, wherein
the machining-fluid-property measuring instrument is conductivity meter that measures the conductivity of the aqueous machining fluid.

3. The electrical-discharge machining apparatus as set forth in claim 2, wherein
the machine platen is constituted of a dielectric material so that the machine platen and the workpiece are electrically insulated from each other.

4. The electrical-discharge machining apparatus as set forth in claim 2, wherein
the machining-fluid-property control means controls the pH of the machining fluid by controlling the fluid passing through at least one of a water-purification resin unit and a corrosion-prevention resin unit that is formed of an anion exchange resin of $OH^-$ type.

5. The electrical-discharge machining apparatus as set forth in claim 4, wherein
the machine platen is constituted of a dielectric material so that the machine platen and the workpiece are electrically insulated from each other.

6. The electrical-discharge machining apparatus as set forth in claim 2, wherein
the machining-fluid-property control means controls the pH of the machining fluid by controlling the fluid passing through at least one of a water-purification resin unit and a corrosion-prevention resin unit that is a mixture of a cation exchange resin and an anion exchange resin.

7. The electrical-discharge machining apparatus as set forth in claim 6,
wherein
the corrosion-prevention resin unit is formed of a cation exchange resin of one of $Na^+$ type, $K^+$ type and $Ca^{2+}$ type, and of an anion exchange resin of one of $OH^-$ type and $CO_3^{2-}$ type.

8. The electrical-discharge machining apparatus as set forth in claim 7, wherein
the machine platen is constituted of a dielectric material so that the machine platen and the workpiece are electrically insulated from each other.

9. The electrical-discharge machining apparatus as set forth in claim 6, wherein
the machine platen is constituted of a dielectric material so that the machine platen and the workpiece are electrically insulated from each other.

10. The electrical-discharge machining apparatus as set forth in claim 1, wherein
the machining-fluid-property control means controls the pH of the machining fluid by controlling the fluid passing through at least one of a water-purification resin unit and a corrosion-prevention resin unit that is a mixture of a cation exchange resin and an anion exchange resin.

11. The electrical-discharge machining apparatus as set forth in claim 10, wherein
the corrosion-prevention resin unit is formed of a cation exchange resin of one of $Na^+$ type, $K^+$ type and $Ca^{2+}$ type, and of an anion exchange resin of one of $OH^-$ type and $CO_3^{2-}$ type.

12. The electrical-discharge machining apparatus as set forth in claim 11, wherein
the machine platen is constituted of a dielectric material so that the machine platen and the workpiece are electrically insulated from each other.

13. The electrical-discharge machining apparatus as set forth in claim 10, wherein
the machine platen is constituted of a dielectric material so that the machine platen and the workpiece are electrically insulated from each other.

14. The electrical-discharge machining apparatus as set forth in claim 1, wherein
the machining-fluid-property control means controls the pH of the machining fluid by controlling the fluid passing through at least one of a water-purification resin unit and a corrosion-prevention resin unit that is formed of an anion exchange resin of $OH^-$ type.

15. The electrical-discharge machining apparatus as set forth in claim 14, wherein
the machine platen is constituted of a dielectric material so that the machine platen and the workpiece are electrically insulated from each other.

16. The electrical-discharge machining apparatus as set forth in claim 1, wherein
the machine platen is constituted of a dielectric material so that the machine platen and the workpiece are electrically insulated from each other.

17. A method of electrical-discharge machining for machining a workpiece, using an aqueous machining fluid as a machining fluid, while applying voltage across a machining gap formed between an electrode and the workpiece, the method of electrical-discharge machining, comprising the steps of:
measuring a state of the machining fluid using machining-fluid-property measuring instrument; and
controlling the pH of the machining fluid so as to be kept within 8.5 through 10.5, based on a measured result from said machining-fluid-property measuring instrument, wherein
the workpiece is machined under a state in which a machine platen where the workpiece is placed and the workpiece are electrically insulated from each other.

18. The method of electrical-discharge machining as set forth in claim 17, wherein
the pH of the machining fluid is controlled by measuring the conductivity of the aqueous machining fluid using the machining-fluid-property measuring instrument, and by passing the fluid through at least one of a water-purification resin unit and a corrosion-prevention resin unit that is a mixture of a cation exchange resin and an anion exchange resin.

19. The method of electrical-discharge machining as set forth in claim 18, wherein
the pH of the machining fluid is controlled by measuring the conductivity of the aqueous machining fluid using the machining-fluid-property measuring instrument, and by passing the fluid through at least one of a water-purification resin unit and a corrosion-prevention resin unit that is formed of an anion exchange resin of $OH^-$ type.

20. A method of electrical-discharge machining a material including superhard material, copper material, iron material, and zinc material, using an aqueous machining fluid, while applying voltage across a machining gap formed between an electrode and the material, the method of electrical-discharge machining, comprising the steps of:
measuring a state of the machining fluid using a machining-fluid-property measuring instrument; and
controlling the pH of the machining fluid so as to be kept within 8.5 through 10.5, based on a measured result from said machining-fluid-property measuring instrument, wherein
a workpiece is machined under a state in which a machine platen where the workpiece is placed and the workpiece are electrically insulated from each other.

* * * * *